(12) United States Patent
Mitra

(10) Patent No.: US 9,513,484 B2
(45) Date of Patent: Dec. 6, 2016

(54) METHOD AND DEVICE FOR FOCUSING LASER LIGHT

(71) Applicant: LIMO PATENTVERWALTUNG GMBH & CO. KG, Dortmund (DE)

(72) Inventor: Thomas Mitra, Dortmund (DE)

(73) Assignee: LIMO Patentverwaltung GmbH & Co. KG, Dortmund (DE)

( * ) Notice: Subject to any disclaimer, the term of this patent is extended or adjusted under 35 U.S.C. 154(b) by 0 days.

(21) Appl. No.: 14/426,885

(22) PCT Filed: Sep. 5, 2013

(86) PCT No.: PCT/EP2013/068368
§ 371 (c)(1),
(2) Date: Mar. 9, 2015

(87) PCT Pub. No.: WO2014/037442
PCT Pub. Date: Mar. 13, 2014

(65) Prior Publication Data
US 2015/0212331 A1    Jul. 30, 2015

(30) Foreign Application Priority Data
Sep. 7, 2012   (DE) .......... 10 2012 108 347

(51) Int. Cl.
*G02B 17/08* (2006.01)
*G02B 27/09* (2006.01)
(Continued)

(52) U.S. Cl.
CPC ....... *G02B 27/0977* (2013.01); *B23K 26/0648* (2013.01); *B23K 26/0738* (2013.01); *G02B 5/136* (2013.01); *G02B 17/004* (2013.01); *G02B 17/0868* (2013.01); *G02B 19/0057* (2013.01); *G02B 27/0966* (2013.01); *G02B 27/0972* (2013.01)

(58) Field of Classification Search
CPC ... G02B 17/004; G02B 17/0868; G02B 17/02; G02B 27/0977; G02B 27/0966; G02B 27/0972; H01S 5/0071; B23K 26/0643; B23K 26/0648; B23K 26/0652
(Continued)

(56) References Cited

U.S. PATENT DOCUMENTS

| 4,192,578 A | 3/1980 | Suzuki et al. |
| 6,252,718 B1 | 6/2001 | Lefevre |

(Continued)

FOREIGN PATENT DOCUMENTS

| CN | 1470900 A | 1/2004 |
| CN | 1664687 A | 9/2005 |

(Continued)

*Primary Examiner* — Darryl J Collins
(74) *Attorney, Agent, or Firm* — Laurence A. Greenberg; Werner H. Stemer; Ralph E. Locher

(57) ABSTRACT

A device focuses laser light into a working plane. The device contains a deflection mirror and a cylindrical lens. A lens apex of the cylindrical lens has an offset and which has a first transmission portion and a second transmission portion different from the first transmission portion. The device further has retroreflector device with an optical axis. The deflection mirror is arranged in the beam path of the device such that it can deflect the laser light during the operation of the device such that the light can propagate substantially parallel to the optical axis of the retroreflector device and can be transmitted through the first transmission portion of the cylindrical lens, and can then be reflected back by the retroreflector device such that the laser light can be transmitted through the second transmission portion of the cylindrical lens and can be focused into the working plane.

10 Claims, 5 Drawing Sheets

(51) Int. Cl.
  *G02B 17/00*   (2006.01)
  *G02B 19/00*   (2006.01)
  *B23K 26/073*  (2006.01)
  *B23K 26/06*   (2014.01)
  *G02B 5/136*   (2006.01)

(58) Field of Classification Search
  USPC ......................................... 359/720, 726–732
  See application file for complete search history.

(56) References Cited

U.S. PATENT DOCUMENTS

| | | | |
|---|---|---|---|
| 6,819,411 B1 * | 11/2004 | Sharpe | G01N 15/1436 250/461.2 |
| 6,919,997 B2 | 7/2005 | Forrer et al. | |
| 7,538,948 B2 | 5/2009 | Muenz et al. | |
| 7,864,429 B2 | 1/2011 | Muenz et al. | |
| 2004/0136094 A1 * | 7/2004 | Forrer | B41J 2/451 359/732 |
| 2006/0091120 A1 | 5/2006 | Markle | |
| 2006/0209310 A1 | 9/2006 | Muenz et al. | |
| 2009/0231718 A1 | 9/2009 | Muenz et al. | |
| 2013/0056450 A1 | 3/2013 | Lissotschenko et al. | |

FOREIGN PATENT DOCUMENTS

| | | |
|---|---|---|
| DE | 102010012459 A1 | 3/2012 |
| DE | 102012012467 A1 | 2/2013 |
| WO | 2006066706 A2 | 6/2006 |

* cited by examiner

METHOD AND DEVICE FOR FOCUSING LASER LIGHT

BACKGROUND OF THE INVENTION

Field of the Invention

The present invention relates to a method and a device for focusing laser light.

DEFINITIONS

The designations light or laser radiation are not intended to imply restriction to the range of visible light. Rather, the designations light or laser radiation are used in the context of this application for electromagnetic radiation in the entire wavelength range from the FIR to the XUV. In propagation direction of the laser radiation or of the light means the average propagation direction of the laser radiation or of the light, particularly when said radiation or light is not a plane wave or is at least partially divergent. Unless expressly indicated otherwise, laser beam, light beam, partial beam or beam does not mean an idealized beam of geometrical optics, but a real light beam such as, for example, a laser beam with a Gaussian profile or a modified Gaussian profile, such as a super-Gaussian profile or a top-hat profile, which has an extended beam cross section—not an infinitesimally small one. Top-hat distribution or top-hat intensity distribution or top-hat profile mean an intensity distribution which, at least as regards one direction, can be described substantially by a rectangular function (rect (x)), or which has a plateau. In this case, real intensity distributions having deviations from a rectangular function, or inclined flanks, are intended to likewise be able to be designated as a top-hat distribution or top-hat profile.

In the prior art, long and relatively narrow laser lines are produced in a working plane in that the laser light emitted by a laser light source—in particular, by a laser diode bar with a plurality of emitters arranged next to one another in a first direction (the so-called slow-axis direction)—and collimated with optical means is directed into a working plane with the aid of cylindrical lens means fabricated with high precision, such that a focus or image is generated there. Such cylindrical lens means have a lens apex extending in a longitudinal direction parallel to the cylindrical axis. In order to obtain a precisely defined laser line in the working plane, the cylindrical lens means used to focus the laser light must have a very straight apex profile in a longitudinal direction. The production of long, narrow and at the same time precisely imaged laser lines is thus determined largely by the quality of the cylindrical lens means used. So-called location errors in the region of the lens apex lead to aberrations which manifest themselves in a fluctuating line width. In the prior art, the fabrication of such precise cylindrical lens means such as are required for the production of precise, linear intensity distributions in a working plane constitutes a major problem.

Illustrated in FIG. 1 is a cylindrical lens means 3 which comprises two cylindrical lens sections 30, 31 which adjoin one another in an x-direction and are, for example, formed from cylindrical lens elements interconnected by bonding. In the ideal case, the lens apex should, as far as possible, extend along the line indicated by M, which defines a middle line of the outer lateral surface of the cylindrical lens means 3, in order thereby to obtain a precise linear intensity distribution in a working plane. It becomes clear that the lens apexes S1, S2 of the two cylindrical lens sections 30, 31 in this case do not extend ideally along the line M but have an offset d. The lens apexes S1, S2 of the first cylindrical lens section 30 and the second cylindrical lens section 31 extend next to the line M so that the offset d forms. It may be noted at this juncture that the size of the offset d between the lens apexes S1, S2 of the two cylindrical lens sections 30, 31 is not drawn to scale, but is intended merely to serve the purpose of simpler graphic illustration. The offset d is usually <0.5 mm in conventional cylindrical lens means 3.

If such a cylindrical lens means 3 is now used to focus a collimated laser beam with a top-hat angle distribution into a working plane, the result of this is an intensity distribution deviating from an "ideal" linear shape, as illustrated in FIG. 2. An intensity distribution which has a focal position error is produced in the working plane 5. It is shown that the intensity I1 of that portion of the laser light which has passed the first cylindrical lens section 30, and the intensity I2 of that portion of the laser light which has passed the second cylindrical lens section 31 have an offset d' orthogonal to the x-direction, the offset d' of the intensities I1, I2 in the working plane 5 corresponding to the offset d of the lens apexes S1, S2 of the two cylindrical lens sections 30, 31. If, for example, the cylindrical lens sections 30, 31 have an offset d=0.2 mm, the offset d' of the intensities I1, I2 in the working plane 5 is likewise 0.2 mm.

The problem of the apex error has been explained above by way of example with the aid of a cylindrical lens means 3 in which the two cylindrical lens sections 30, 31 are formed from two cylindrical lens elements interconnected by bonding. The problem of the apex error can, however, also occur in the case of unipartite cylindrical lens means 3 in the case of which, owing to frequently unavoidable fabrication inaccuracies, the lens apex S1, S2 does not run ideally straight, parallel to the cylindrical axis, but likewise has an offset d.

BRIEF SUMMARY OF THE INVENTION

The object of the present invention is to specify a method and a device for focusing laser light into a working plane so as to make it possible to be able to use even less precisely fabricated cylindrical lens means, or else to be able to use cylindrical lens means assembled from a plurality of cylindrical lens elements, and nevertheless to be able to generate a linear intensity distribution in the working plane.

This object is achieved by a method for focusing laser light having the features of the main method claim. As regards the device, said object is achieved by a device for focusing laser light having the features of the main device claim. The subclaims relate to advantageous developments of the invention.

In the case of a method according to the invention for focusing laser light into a working plane, the laser light is deflected by a deflection mirror in such a way that it is propagated substantially parallel to an optical axis of a retroreflector means and is transmitted by a first transmission portion of a cylindrical lens means whose lens apex has an offset, and is subsequently reflected back by the retroreflector means in such a way that the laser light is transmitted by a second transmission portion of the cylindrical lens means which is different from the first transmission portion, and focused into the working plane. The method according to the invention advantageously enables a compensation of the offset of the lens apex of the cylindrical lens means such that despite said offset in the working plane it is possible to produce a substantially linear intensity distribution.

It is proposed in a particularly preferred embodiment that an apex line of the retroreflector means and/or the lens apex of the cylindrical lens means are/is displaced in the optical beam path in such a way that the angle of the input beam of the laser light, and/or the angle of the output beam of the laser light can be set. A greater flexibility for focusing the laser light into the working plane is thereby achieved.

In a preferred embodiment, it is proposed that an inverting prism is used as retroreflector means. In an alternative embodiment, it is possible to use an inverting mirror as retroreflector means. Inverting prisms or inverting mirrors can be produced very easily and cost-effectively and are therefore suitable, in particular, for use as retroreflector means in the method presented here.

In accordance with claim 5, a device for focusing laser light into a working plane comprises
a deflection mirror,
a cylindrical lens means, whose lens apex has an offset and which comprises a first transmission portion and a second transmission portion which is different from the first transmission portion, and
a retroreflector means which has an optical axis
wherein the deflection mirror is arranged in the beam path of the device such that it can deflect the laser light during the operation of the device in such a way that it can propagate substantially parallel to the optical axis of the retroreflector means and can be transmitted by the first transmission portion of the cylindrical lens means and can subsequently be reflected back by the retroreflector means in such a way that the laser light can be transmitted by the second transmission portion of the cylindrical lens means and can be focused into the working plane. The device according to the invention advantageously enables a compensation of the offset of the lens apex of the cylindrical lens means such that it is possible to produce a substantially linear intensity distribution despite said offset in the working plane. Owing to the fact that a deflection mirror is arranged between the laser light source and the cylindrical lens means, the point of incidence of the input beam of the laser light on the deflection mirror is separated from the point of incidence of the output beam of the laser light after the first passage through the cylindrical lens means and the passage through the retroreflector means in that the cylindrical lens means is not oriented orthogonally to the input beam of the laser light incident on the retroreflector means.

The basic idea of the method according to the invention and/or of the device according to the invention therefore consists in that the laser light of the laser light source does not strike the working plane directly through the cylindrical lens which forms a focusing lens. Rather, a retroreflector means is provided which is advantageously capable of correcting location errors of the lens apex in such a way that an offset of the lens apex relative to the beam striking the cylindrical lens means produces only a minimum offset of the laser beam imaged onto the working plane. Said "error" occurs in that angle at which the image is produced in the working plane. However, the same is much less critical in the typical application as a rule than is a fluctuating line width.

In a preferred embodiment, it is proposed that the retroreflector means is designed as an inverting prism having a first light deflection surface and a second light deflection surface. At each of the two light deflection surfaces, the laser light is deflected by 90° in each case in accordance with the physical principle of total internal reflection such that the laser light striking the inverting prism is deflected overall by 180°. Upstream and downstream of the inverting prism, the laser light is propagated substantially parallel to the optical axis of the inverting prism. The light deflection surfaces of the inverting prism can also optionally be of metalized design.

In a particularly advantageous embodiment, it is proposed that an apex line is formed between the first light deflection surface and the second light deflection surface of the inverting prism, and the device comprises means for displacing the apex line. By displacing the apex line of the inverting prism (and therefore also of the inverting prism itself), it is possible for angular relationships of the input beam and the output beam of the laser light to be advantageously adjusted.

In an alternative embodiment, it can be provided that the retroreflector means is designed as an inverting mirror with a first mirror surface and with a second mirror surface. The laser light is respectively deflected by 90° at each of the two mirror surfaces such that the laser light striking the inverting mirror is deflected overall by 180°. Upstream and downstream of the inverting prism, the laser light is propagated substantially parallel to the optical axis of the inverting mirror.

In an advantageous embodiment, it is possible that an apex line is formed between the first light deflection surface and the second light deflection surface of the inverting mirror, and the device comprises means for displacing the apex line. By displacing the apex line of the inverting mirror (and therefore also of the inverting mirror itself), it is possible for angular relationships of the input beam and the output beam of the laser light to be advantageously adjusted.

In a further particularly advantageous embodiment, it can be provided that the device has means for displacing the lens apex of the cylindrical lens means. By displacing the apex line of the cylindrical lens means (and therefore also of the cylindrical lens means itself), it is possible for angular relationships of the input beam and the output beam of the laser light to be advantageously further adjusted.

BRIEF DESCRIPTION OF THE SEVERAL VIEWS OF THE DRAWING

Further features and advantages of the present invention become clear with the aid of the following description of preferred exemplary embodiments with reference to the attached drawings, in which.

DESCRIPTION OF THE INVENTION

Figure 1:
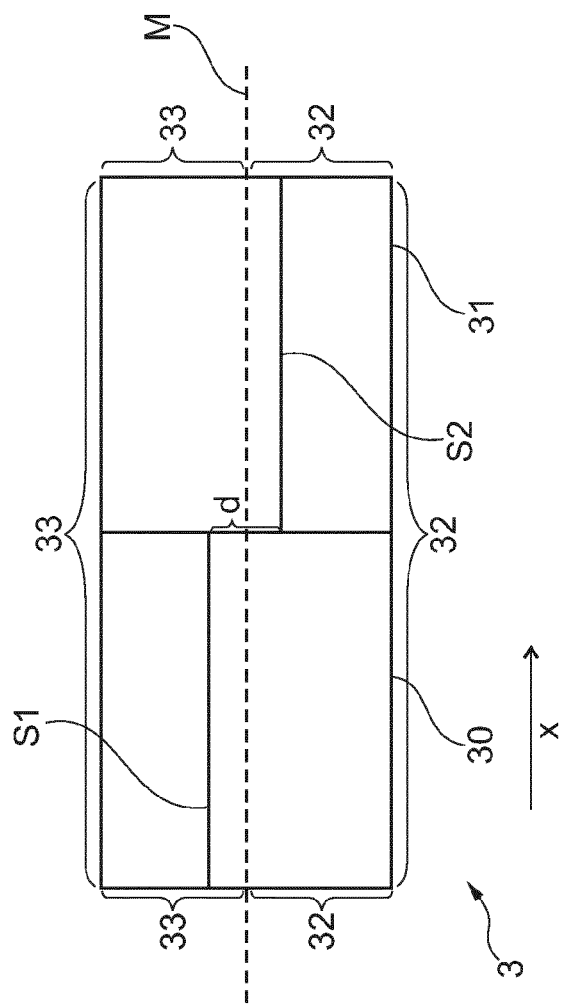
FIG. 1 shows a plan view of a cylindrical lens means which has an apex error.
Figure 2:
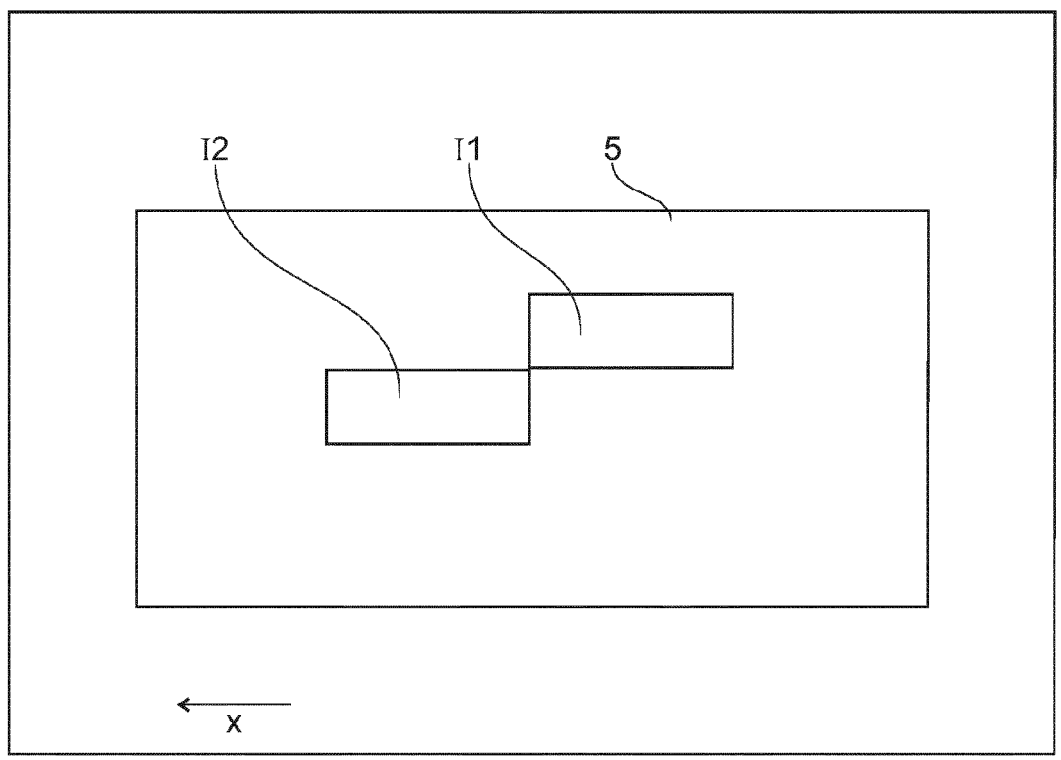
FIG. 2 is a schematic of an intensity distribution of laser light which has been focused into a working plane by means of the cylindrical lens means in accordance with FIG. 1.

The aim below is to explain two exemplary embodiments of the present invention in more detail with reference to FIGS. 3 to 5. For the purpose of simplifying the following description, two-dimensional Cartesian coordinate systems which define the mutually orthogonal y- and z-directions have been drawn here in FIGS. 3 and 4. The x-direction extends orthogonally to the y- and z-directions into the plane of the drawing.

Figure 3:
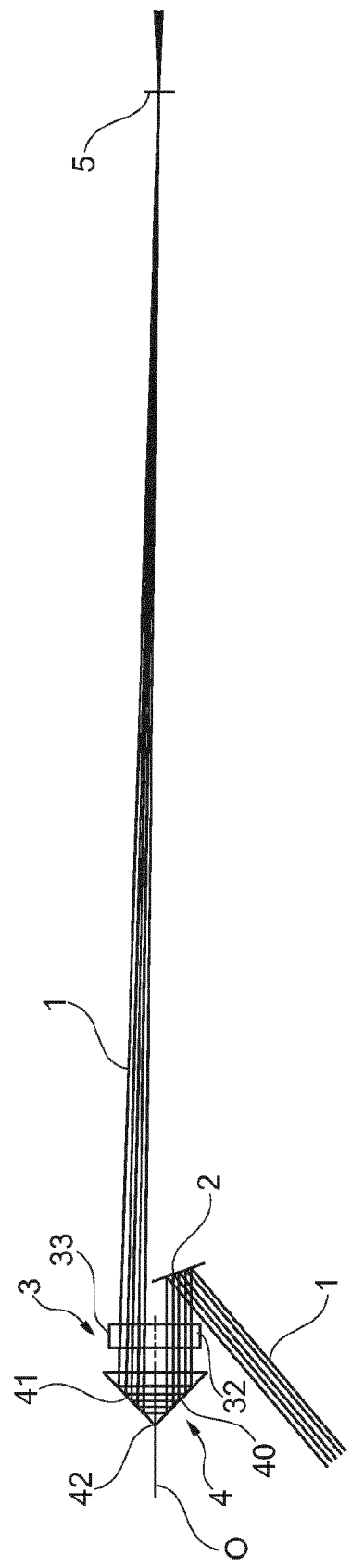
FIG. 3 is a schematic of a device for focusing laser light which is designed in accordance with a first exemplary embodiment of the present invention.

A device for focusing laser light 1, which is designed in accordance with a first exemplary embodiment of the present invention, is shown in FIG. 3. From a laser light source—in particular from a laser diode bar with a plurality of emitters which are arranged spaced apart next to one another in a first direction (the so-called slow-axis direction)—which is not explicitly illustrated here for reasons of simplification, the laser light 1 striking the device is emitted and collimated with the aid of suitable optical means (likewise not explicitly illustrated). The propagation direction in which the laser light 1 of the laser light source is firstly propagated is the z-direction in this case.

In this exemplary embodiment, the device for focusing laser light 1 comprises a deflection mirror 2, a cylindrical lens means 3 whose cylindrical axis extends in the x-direction (that is to say into the plane of the drawing here) and a retroreflector means which is formed in this exemplary embodiment by an inverting prism 4 which comprises a first light deflection surface 40 and a second light deflection surface 41 which include an angle of 90° with one another and thereby form an apex line 42. The optical axis O of the inverting prism 4 extends perpendicularly to the apex line 42. The inverting prism 4 is capable of deflecting the incident laser light 1 by 180°. The cylindrical lens means 3 is designed as illustrated in FIG. 1. The apexes S1, S2 of the two cylindrical lens sections 30, 31 therefore have the offset d>0 mm illustrated in FIG. 1.

The collimated laser light 1 propagating in the z-direction firstly strikes the deflection mirror 2, which is arranged inclined in the beam path of the device in such a way that it can deflect the laser light 1 so that the propagation direction of the laser light 1 extends substantially parallel to the optical axis O of the inverting prism 4 after reflection at the deflection mirror 2. The laser light 1 is transmitted by a first transmission portion 32 of the cylindrical lens means 3, which portion is marked by curly brackets and is formed by subregions of the first and second cylindrical lens sections 30, 31 which extend from the outer edges as far as the middle line M (see FIG. 1). When being transmitted through the first transmission portion 32, the laser light 1 is subjected to the offset d of the lens apexes S1, S2. The laser light 1 then strikes the inverting prism 4 and is deflected at the first light deflection surface 40 and at the second light deflection surface 41 in accordance with the physical principle of total internal reflection by 90° in each case. The laser light 1 striking the inverting prism 4 is therefore deflected by 180° overall.

The laser light 1 deflected by 180° is propagated in turn substantially parallel to the optical axis O of the inverting prism 4, and subsequently strikes a second transmission portion 33, likewise marked by curly brackets, of the cylindrical lens means 3 which differs from the first transmission portion 32 and is likewise formed by subregions of the first and second cylindrical lens sections 30, 31 which extend from the outer edges up to the middle line M. When being transmitted through the first transmission portion 32, the laser light 1 is subjected to the offset of the lens apexes S1, S2. The laser light 1 is transmitted by the second transmission portion 33 of the cylindrical lens means 3 and refracted at the curved light exit surface of the second transmission portion 33 of the cylindrical lens means 3 in such a way that it is focused into the working plane 5 in which a substantially linear intensity distribution is produced, as is illustrated schematically in FIG. 5.

Figure 5:
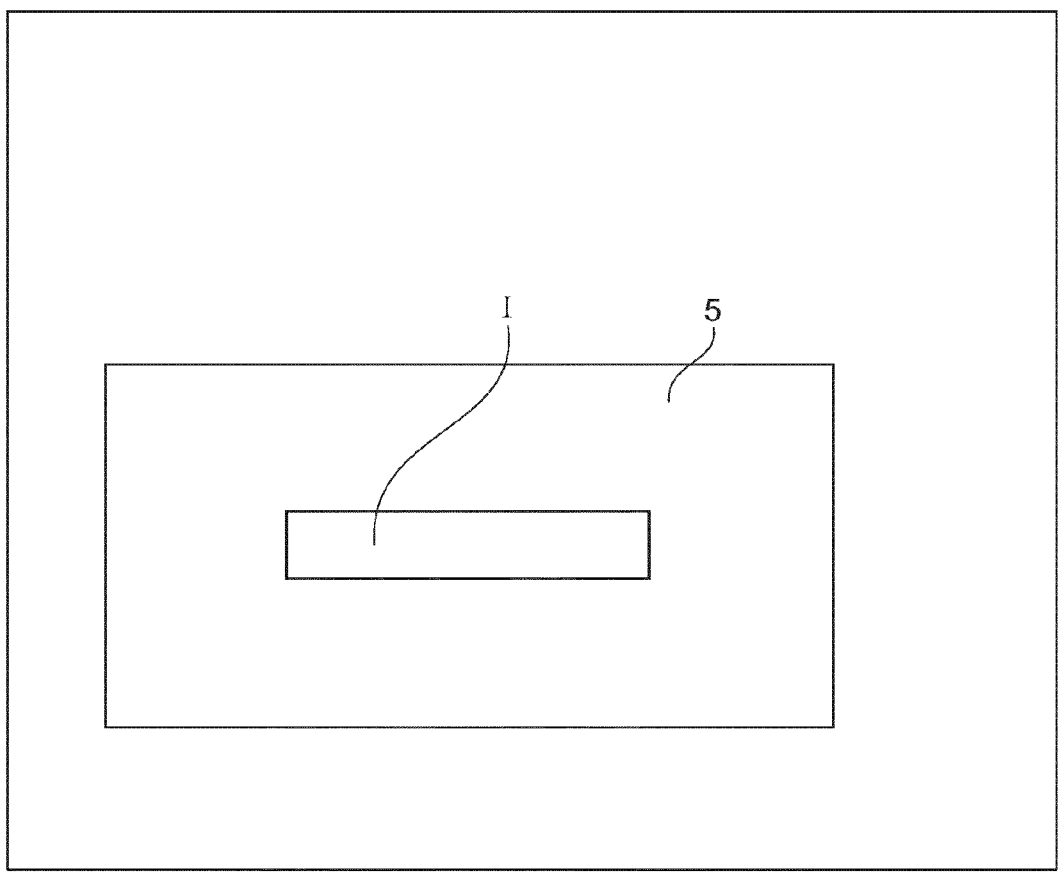
FIG. 5 is a schematic of an intensity distribution of the laser light which has been focused into a working plane by means of a device in accordance with FIG. 3 or 4.

It becomes clear with the aid of the illustration in FIG. 5 that the device presented here for focusing laser light 1 (with a top-hat angle distribution in this case) can be used to produce the desired linear intensity distribution I in the working plane 5 despite the offset d of the lens apexes S1, S2. If the apexes S1, S2 of the two cylindrical lens sections 30, 31 have, for example, an offset d=0.2 mm (for example, owing to inaccurate fabrication or because the cylindrical lens means 3 is produced from two cylindrical lens elements interconnected by bonding), it is possible that the device presented here for focusing laser light 1 can correct and compensate the offset of the apexes S1, S2 of the two cylindrical lens sections 30, 31 in such a way that it is scarcely possible to measure an offset of the intensity distribution I orthogonal to the x-direction in the working plane 5. By way of example, further investigations have shown that given an offset of the apexes S1, S2 of the two cylindrical lens sections 30, 31 by 0.4 mm, the offset of the intensity distribution I at the focus in the working plane 5 is only approximately 10 µm (and therefore around 1/40 of the apex error).

Figure 4:
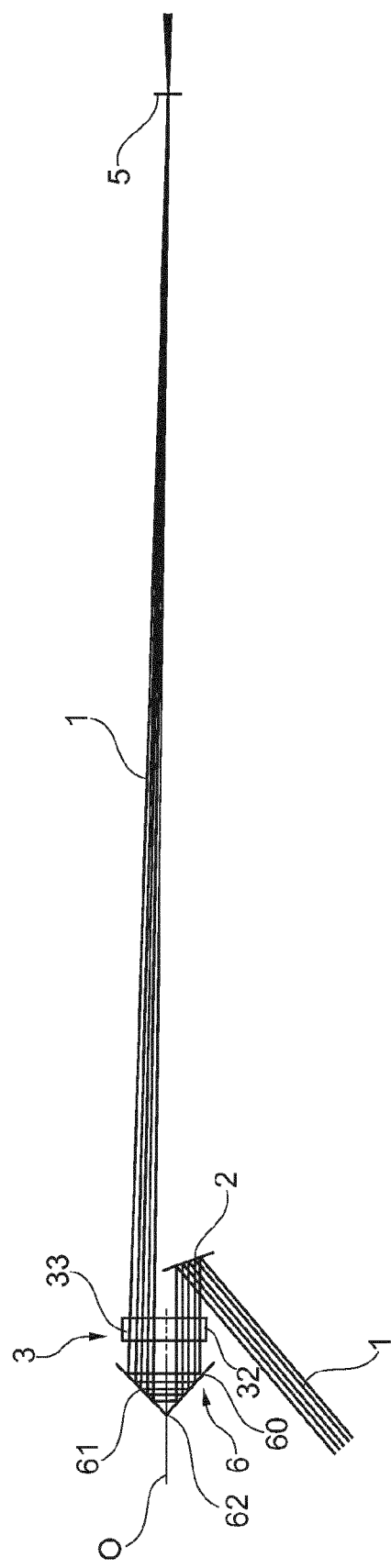
FIG. 4 is a schematic of a device for focusing laser light which is designed in accordance with a second exemplary embodiment of the present invention.

FIG. 4 shows a device for focusing laser light 1 which is designed in accordance with a second exemplary embodiment of the present invention. The basic design of the device corresponds to that of the first exemplary embodiment. The device comprises in turn a deflection mirror 2, a cylindrical lens means 3 and a retroreflector means which is formed in said exemplary embodiment by an inverting mirror 6. The inverting mirror 6 has a first mirror surface 60 and a second mirror surface 61, which include an angle of 90° with one another and thereby form an apex line 62. The optical axis O of the inverting mirror 6 extends perpendicular to the apex line 62.

The collimated laser light 1 of the laser light source firstly propagates once again in z-direction, and strikes the deflection mirror 2, which is arranged inclined in the beam path of the device in such a way that it can deflect the laser light 1 such that the propagation direction of the laser light 1 after reflection at the deflection mirror 2 extends substantially parallel to the optical axis O of the inverting mirror 6.

As in the first exemplary embodiment, the laser light 1 is transmitted by the first transmission portion 32 of the cylindrical lens means 3. In this case, when being transmitted by the first transmission portion 32 the laser light 1 is subjected to the offset d of the lens apexes S1, S2. The laser light 1 then strikes the first mirror surface 60 of the inverting mirror 6, which deflects said light by 90°. The laser light 1 then strikes the second mirror surface 61 of the inverting mirror 6 and is deflected there again by 90°. That is to say, the incident laser light 1 is deflected by 180° overall with the aid of the inverting mirror 6. The laser light 1 deflected by 180° then strikes the second transmission portion 33 of the cylindrical lens means 3 which—as described above—differs from the first transmission portion 32. When being transmitted by the first transmission portion 32, the laser light 1 is subjected again to the offset of the lens apexes S1, S2. The laser light 1 is transmitted by the second transmission portion 33 of the cylindrical lens means 3 and refracted at the curved light exit surface of the second transmission portion 33 of the cylindrical lens means 3 in such a way that it is focused into the working plane 5 in which a linear intensity distribution I is produced, again, as is illustrated in FIG. 5.

The idea on which the two exemplary embodiments of the invention presented here are based therefore consists in that the laser light 1 of the laser light source does not strike the working plane 5 directly through the cylindrical lens means 3 forming a focusing lens, but that a retroreflector means (in particular, an inverting prism 4 or an inverting mirror 6) is provided, by means of which the laser light 1, which has been transmitted by a first transmission portion 30 of the cylindrical lens means 3, can be deflected by 180° in such a way that it can be transmitted by a second transmission portion 33, which differs from the first transmission portion 32 and can focus said light into the working plane 5. When being transmitted by the first transmission portion 32 and by the second transmission portion 33, the laser light 1 is respectively subjected to the offset of the lens apexes S1, S2. The retroreflector means is advantageously capable of correcting location errors of the lens apex S1, S2 in such a way that the offset d of the lens apex S1, S2 produces an offset of the laser light 1 imaged onto the working plane 5 which is only minimal in relation to the laser light 1 striking the cylindrical lens means 3. This "error" occurs in that angle at which the image is produced in the working plane 5. However, as a rule this is far less critical in the typical application than is a fluctuating line width.

The angle of the input beam of the laser light 1 and the angle of the output beam of the laser light 1 can advantageously continue to be set by displacing the apex S1, S2 of the cylindrical lens means 3, and/or by displacing the apex line 42, 62 of the inverting prism 4 and/or of the inverting mirror 6.

The invention claimed is:

1. A method for focusing laser light into a working plane, which comprises the steps of:
    deflecting the laser light by a deflection mirror such that the laser light is propagated substantially parallel to an optical axis of a retroreflector and is transmitted by a first transmission portion of a cylindrical lens whose lens apex has an offset, and is subsequently reflected back by the retroreflector such that the laser light is transmitted by a second transmission portion of the cylindrical lens which is different from the first transmission portion, and focused into the working plane.

2. The method according to claim 1, which further comprises displacing at least one of an apex line of the retroreflector or the lens apex of the cylindrical lens in an optical beam path such that at least one of an angle of an input beam of the laser light or an angle of an output beam of the laser light can be set.

3. The method according to claim 1, which further comprises providing an inverting prism as the retroreflector.

4. The method according to claim 1, which further comprises providing an inverting mirror as the retroreflector.

5. A device for focusing laser light into a working plane, the device comprising:
    a deflection mirror;
    a cylindrical lens with a lens apex being offset and having a first transmission portion and a second transmission portion being different from said first transmission portion; and
    a retroreflector having an optical axis, said deflection mirror disposed in a beam path of the device such that said deflection mirror can deflect the laser light during an operation of the device such that the laser light propagates substantially parallel to the optical axis of said retroreflector and transmitted by said first transmission portion of said cylindrical lens and can subsequently be reflected back by said retroreflector such that the laser light can be transmitted by said second transmission portion of said cylindrical lens and can be focused into the working plane.

6. The device according to claim 5, wherein said retroreflector is configured as an inverting prism having a first light deflection surface and a second light deflection surface.

7. The device according to claim 6,
    wherein an apex line is formed between said first light deflection surface and said second light deflection surface of said inverting prism; and
    further comprising means for displacing the apex line.

8. The device according to claim 5, wherein said retroreflector is an inverting mirror with a first mirror surface and a second mirror surface.

9. The device according to claim 8,
    wherein an apex line is formed between said first mirror surface and said second mirror surface of said inverting mirror; and
    further comprising a means for displacing the apex line.

10. The device according to claim 5, further comprising means for displacing the lens apex of said cylindrical lens.

* * * * *